US009767500B2

(12) United States Patent
Cummins et al.

(10) Patent No.: US 9,767,500 B2
(45) Date of Patent: Sep. 19, 2017

(54) METHOD AND SYSTEM FOR DISPLAYING PRODUCT INFORMATION ON A CONSUMER DEVICE

(71) Applicant: MasterCard International Incorporated, Purchase, NY (US)

(72) Inventors: Oran Cummins, Dublin (IE); Garry Lyons, Dublin (IE); Matthew Hopkins, St. Peters, MO (US); Prashant Sharma, Ballwin, MO (US); Stephen Elder, Dublin (IE); Stephen Whitney, Monkstown (IE); Richard Burdett, London (GB); Tina Doran, South Woodford (GB); Michael Friedman, Norwalk, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 796 days.

(21) Appl. No.: 13/776,810

(22) Filed: Feb. 26, 2013

(65) Prior Publication Data

US 2013/0282526 A1 Oct. 24, 2013

Related U.S. Application Data

(60) Provisional application No. 61/625,982, filed on Apr. 18, 2012, provisional application No. 61/659,783, (Continued)

(51) Int. Cl.
*G06Q 30/06* (2012.01)
*G06Q 30/08* (2012.01)

(52) U.S. Cl.
CPC ................ *G06Q 30/0623* (2013.01)

(58) Field of Classification Search
USPC ................................. 705/26.1, 27.1
See application file for complete search history.

(56) References Cited

U.S. PATENT DOCUMENTS 6,826,594 B1 * 11/2004 Pettersen .......... G06F 17/30893
705/59
7,149,754 B2 * 12/2006 Miller ................ G06Q 30/02
707/803
(Continued)

FOREIGN PATENT DOCUMENTS

KR 10-0867005 B1 11/2008

OTHER PUBLICATIONS

Notification of Transmittal of the International Search Report and the Written Opinion of the International Searching Authority, or the Declaration (PCT/ISA/220), PCT International Search Report (PCT/ISA/210) and Written Opinion of the International Searching Authority (Form PCT/ISA/237) issued on Jun. 25, 2013, in corresponding International Application No. PCT/US2013/032013. (13 pages).

*Primary Examiner* — James Zurita
(74) *Attorney, Agent, or Firm* — Buchanan Ingersoll & Rooney PC

(57) ABSTRACT

A method for displaying product details on a consumer device includes: preparing digital media for display on the device; detecting whether the digital media includes at least one product available for purchase; receiving a plurality of product data sets, each set associated with a product identifier and product details for an available product, the product details including information to initiate a transaction for the product; identifying an index of products in the digital media, the index including for each product a display location and a product identification number; receiving an indication from a user identifying a selected product in the digital media based on a display location in the digital media of the product and/or selection from a listing of the product in the index; retrieving product details for the product based
(Continued)

on the product identification number and the product identifier; and displaying the retrieved product details.

47 Claims, 11 Drawing Sheets

Related U.S. Application Data filed on Jun. 14, 2012, provisional application No. 61/703,028, filed on Sep. 19, 2012.

(56) References Cited

U.S. PATENT DOCUMENTS

| | | |
|---|---|---|
| 7,240,075 B1 | 7/2007 | Nemirofsky et al. |
| 2003/0095525 A1 | 5/2003 | Lavin et al. |
| 2003/0158792 A1 | 8/2003 | Perkowski |
| 2009/0231293 A1* | 9/2009 | Nakayama ......... G01C 21/3611 345/173 |
| 2011/0082735 A1 | 4/2011 | Kannan et al. |
| 2012/0069131 A1* | 3/2012 | Abelow ............... G06Q 10/067 348/14.01 |

* cited by examiner

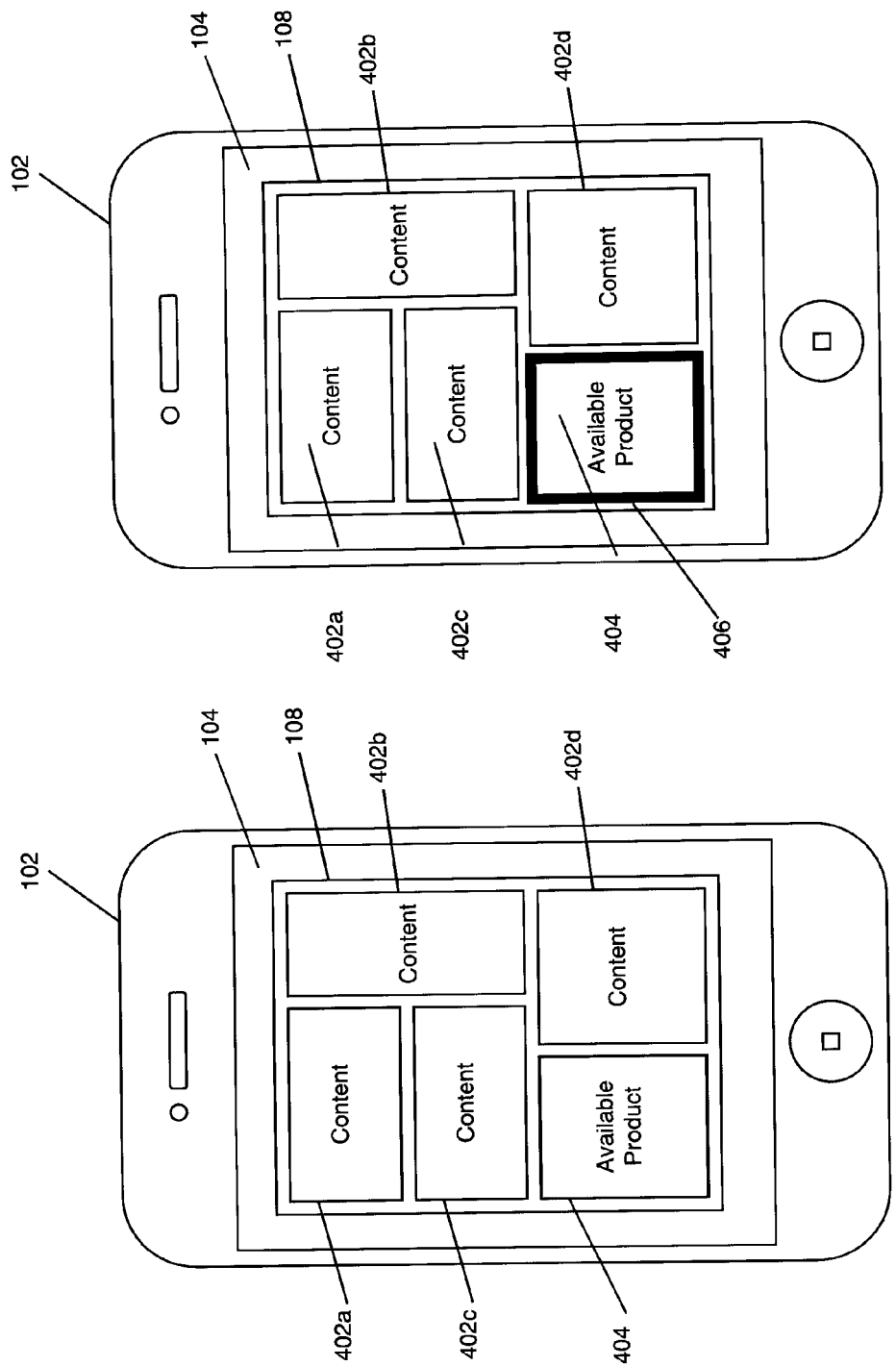

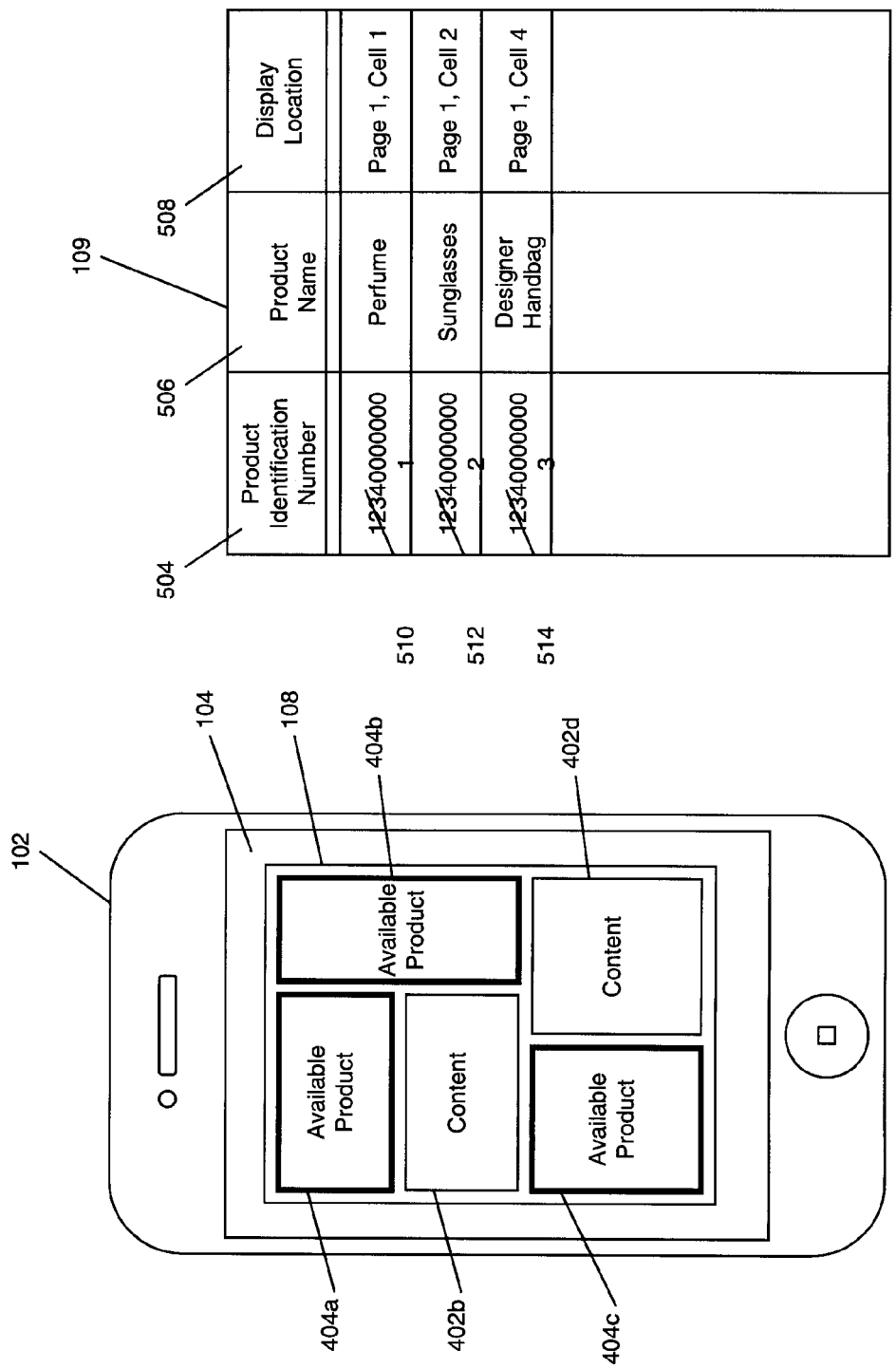

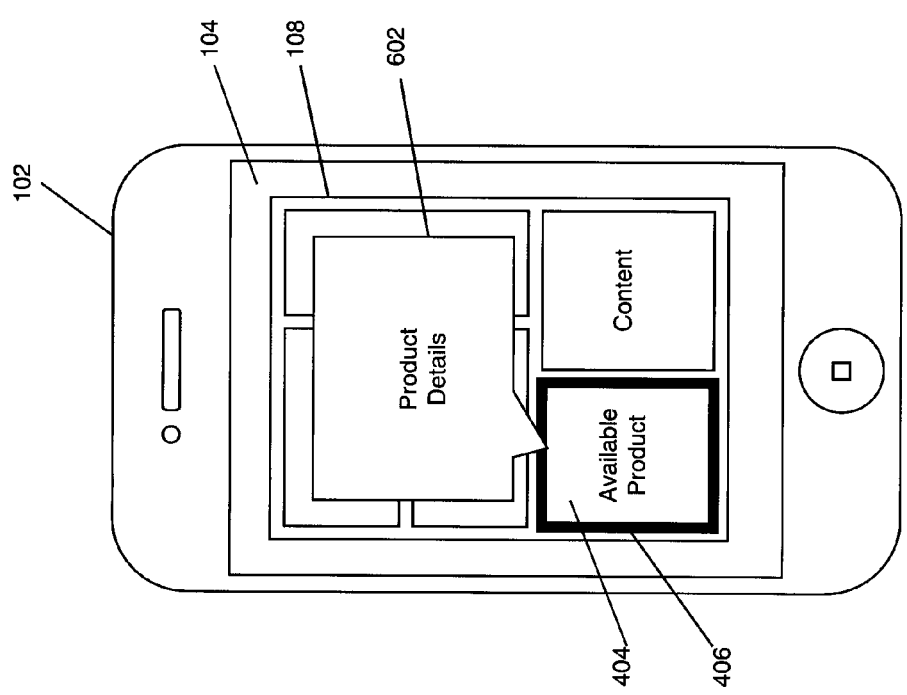

METHOD AND SYSTEM FOR DISPLAYING PRODUCT INFORMATION ON A CONSUMER DEVICE

RELATED APPLICATIONS

The entire contents of U.S. Provisional Application No. 61/625,982, filed Apr. 18, 2012, U.S. Provisional Application No. 61/659,783, filed Jun. 14, 2012, and U.S. Provisional Application No. 61/703,028, filed Sep. 19, 2012 are hereby incorporated by reference.

FIELD

The present disclosure relates to displaying product information on a consumer device, specifically seamlessly displaying product information for a product available for purchase featured in digital media.

BACKGROUND

As time goes on, computers and computing devices have become increasingly more advanced, allowing users to do more things, in more places, and in less time. Desktop computers largely gave way to laptop computers, which largely gave way to tablet computers and slates. Mobile telephones became smart phones and allowed users to be plugged into the Internet on the go. Even televisions have become smart devices, allowing users to be constantly connected to the Internet and engage in a variety of activities. During all of these advances, consumers have regularly used these various computing devices to purchase products on the Internet and engage in electronic commerce (e-commerce). However, while the devices consumers used advanced, the consumer e-commerce experience has remained largely the same.

In the traditional online shopping experience, a consumer would see an advertisement for a product, navigate to a website offering the product, find the product on the site, add it to a shopping cart, confirm shipping and billing details, and then purchase the product. This type of purchasing process requires significant time and interaction on the part of the consumer, and as a result has a high abandonment rate. Some websites that offer products for purchase have attempted to streamline the process, allowing for a user to save billing and shipping information and forego the use of a shopping cart, which lets a user to purchase an item directly from a webpage.

However, this improved process is only available to consumers who were already at the retail site, and were therefore previously interested to a product and went to the website to browse. Therefore, if a consumer were viewing an advertisement and wished to take advantage of the easier process, they would still be required to navigate to the retailer website, search for the product, and then make the purchase. This process can be increasingly cumbersome on mobile computing devices, where navigating and searching can be more difficult. To assist consumers, some advertisers have begun to embed advertisements with hyperlinks directly to a retailer that offers the more streamlined purchase process.

However, providing a hyperlink still requires the consumer to leave the media they are viewing to visit the retailer website. If the media is being viewed in a separate application (e.g., a news reader), it requires the launching of and switching to a browser, which can take considerable time, resources, and patience on the part of the consumer. Furthermore, it takes the consumer away from the digital media they are viewing, which on one hand can deter the consumer from making the purchase, or on the other can pull the consumer away from the media and reduce the possibility of additional purchases. Thus, there is a perceived opportunity to improve the display of product information on a consumer device and the initiation of a transaction for the product without detracting from the digital media.

SUMMARY

The present disclosure provides a description of systems and methods for displaying product information on a consumer device and systems and methods for distributing digital media to a consumer device.

A method for displaying product information on a consumer device includes: preparing for display, by a display of the consumer device, digital media; detecting, by a processing device, whether the digital media includes an indication that at least one product appearing in the digital media may be available for purchase; receiving, from a product database, a plurality of product data sets, wherein each data set in the plurality of product data sets is associated with at least a product identifier corresponding to a product available for purchase and product details, the product details including information to at least initiate a transaction for the corresponding product available for purchase; identifying an index of at least one product available for purchase that appears in the digital media, wherein the index includes, for each of the at least one product, at least a display location of the associated product in the digital media and a product identification number corresponding to the associated product; receiving an indication from a user identifying a selected product of the at least one product based at least on at least one of: a display location in the digital media of the selected product and from a listing of the selected product in a display of the index; retrieving, from a product database, product details associated with the selected product based on the product identification number associated with the selected product and the product identifier associated with the product details; and displaying, by the display, the retrieved product details.

A method for distributing digital media to a consumer device, including: storing, in a database, a digital media; identifying, in a product index, at least one product available for purchase that appears in the digital media, wherein the product index includes, for each of the at least one product, at least a display location of the associated product in the digital media and a product identification number corresponding to the associated product; associating, by a processor, the product index with the digital media; and transmitting to the consumer device, the digital media and the associated product index for display on the consumer device. The consumer device is configured to: display, by a display of the consumer device, the digital media; detect, by a processing device of the consumer device, the product index associated with the digital media; receive an indication from a user identifying a selected product of the at least one product available for purchase in the digital media based on at least one of: the corresponding display location of the associated product and from a listing of the selected product in a display of the product index; retrieve, from a product database, product details associated with the selected product based on at least the product identification number associated with the selected product, wherein the product details includes at least information to at least initiate a transaction for the corresponding product available for purchase; and display, by the display of the consumer device, the retrieved product details.

A consumer device, comprising: a display configured to display digital media; a receiver configured to receive, from a product database, at least one product data set, wherein each product data set of the at least one product data set is associated with at least a product identifier corresponding to a product available for purchase and product details, the product details including information to at least initiate a transaction for the corresponding product available for purchase; and a processor. The processor is configured to: detect whether the digital media includes an indication that at least one product appearing in the digital media may be available for purchase; identify an index of at least one product available for purchase that appears in the digital media, wherein the index includes, for each of the at least one product, at least a display location of the associated product in the digital media and a product identification number corresponding to the associated product; receive an indication from a user identifying a selected product of the at least one product based at least on at least one of: a display location in the digital media of the selected product and from a listing of the selected product in a display of the index; identify, in the received at least one product data set, product details associated with the selected product based on at least the product identification number associated with the selected product and the product identifier associated with the product details; and cause the display to display the identified product details.

A system for distributing digital media to a consumer device, including a database configured to store a digital media, a processor, and a transmitter. The processor is configured to identify, in a product index, at least one product available for purchase that appears in the digital media, wherein the product index includes, for each of the at least one product, at least a display location of the associated product in the digital media and a product identification number corresponding to the associated product, and associate the product index with the digital media. The transmitter is configured to transmit to the consumer device, the digital media and the associated product index for display on the consumer device. The consumer device is configured to: display, by a display of the consumer device, the digital media; detect, by a processing device of the consumer device, the product index associated with the digital media; receive an indication from a user identifying a selected product of the at least one product available for purchase in the digital media based on at least one of: the corresponding display location of the associated product and from a listing of the selected product in a display of the product index; retrieve, from a product database, product details associated with the selected product based on at least the product identification number associated with the selected product, wherein the product details includes at least information to at least initiate a transaction for the corresponding product available for purchase; and display, by the display of the consumer device, the retrieved product details.

BRIEF DESCRIPTION OF THE DRAWING FIGURES

Exemplary embodiments are best understood from the following detailed description when read in conjunction with the accompanying drawings. Included in the drawings are the following figures:

FIGS. 4A and 4B are diagrams illustrating a graphical user interface for indicating a product available for purchase in digital media on a consumer device in accordance with exemplary embodiments.

FIGS. 5A and 5B are diagrams illustrating a graphical user interface and accompany product index for a plurality of products available for purchase in digital media on a consumer device in accordance with exemplary embodiments.

FIG. 6 is a diagram illustrating a graphical user interface for the display of product information on a consumer device in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Displaying Product Information on a Consumer Device

Figure 1:
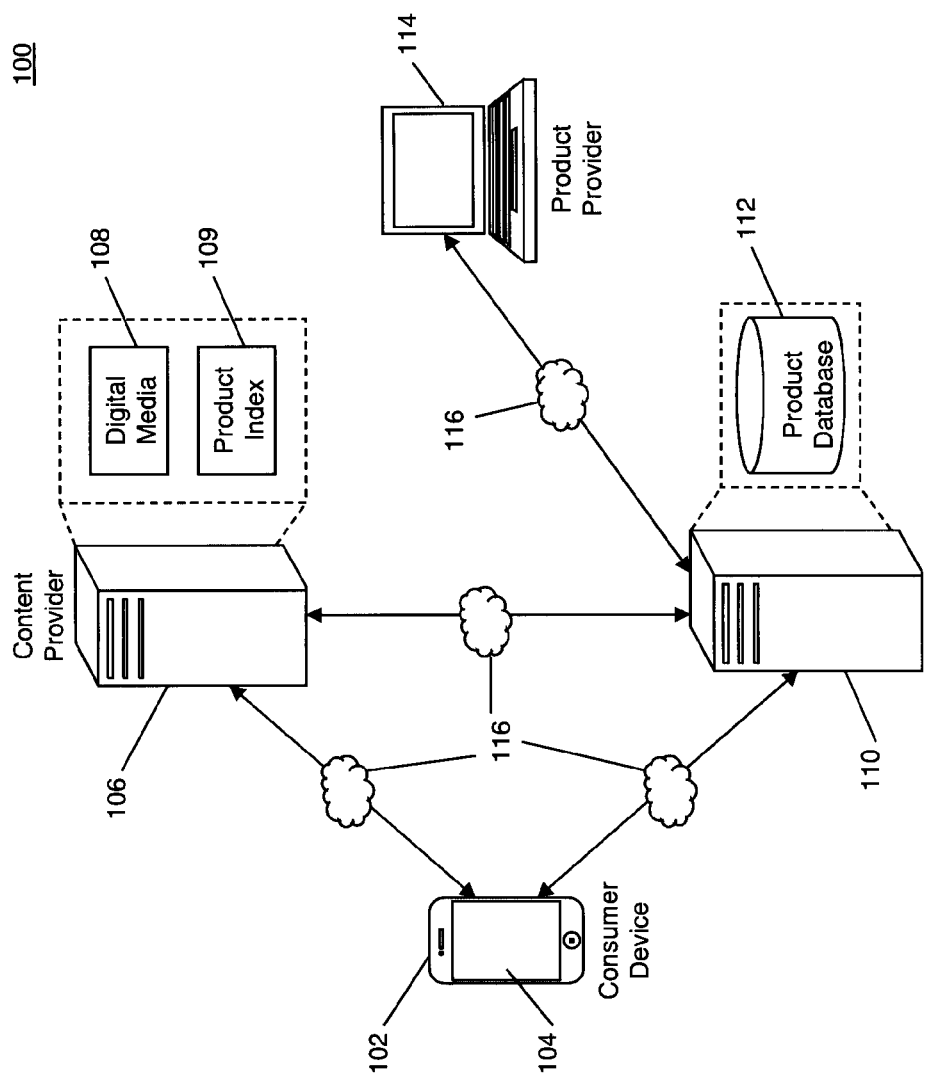
FIG. 1 is a block diagram illustrating a system for displaying product information on a consumer device in accordance with exemplary embodiments.

FIG. 1 illustrates a system 100 for displaying product information on a consumer device. The system 100 may include a consumer device 102, a server 110, a content provider 106, and a product provider 114. Also, to complete a purchase, or payment card transaction acquirer 118 and a payment card issuer 120, which would carry out a transaction, initiated using the current system of selecting a product, using conventional payment card transaction processing as part of a seamless transaction that does not require leaving the application or program implementing this process, or linking over to switch to an external website or service. Here, "payment card" should be given a broad understanding and include credit, debit, merchant or other payment accounts, such as MasterCard, Visa, American Express, Discover, PayPal or the like. Each of the components of the system 100 may be connected via a network 116. The network 116 may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof.

The server 110 may include a product database 112. The product database 112 may include a plurality of product data sets, discussed in more detail below. Data stored in the product database 112 may be stored on any type of suitable computer readable media, such as optical storage (e.g., a compact disc, digital versatile disc, Blu-ray disc, etc.) or magnetic tape storage (e.g., a hard disk drive). The product database 112 may be configured in any type of suitable database configuration, such as a relational database, a structured query language (SQL) database, a distributed database, an object database, etc. Suitable configurations and database storage types will be apparent to persons having skill in the relevant art. The product database 112 may be a single database, or may comprise multiple databases which may be interfaced together (e.g., physically or via a network, such as the network 116).

The server 110 may communicate with the product provider 114. The product provider may provide information to the server 110 that may be stored in the product database 112. Types of information provided by the product provider 114 will be apparent to persons having skill in the relevant art and may include product names, product identifiers, purchase information (e.g., price, size, purchase location, purchase address, shipping information, etc.), merchant information, etc. In one embodiment the product provider 114 may be a merchant offering products (e.g., goods or services) for purchase. In another embodiment the product provider 114 may be a manufacturer that manufactures products for purchase. Other entities can, of course, be product providers in this context.

The server 110 may also communication with the content provider 106. The content provider 106 may include digital media 108 and a product index 109, discussed in more detail below. The digital media 108 may be any digital media suitable for display on a display 104 of the display device 102 and may include still images or moving picture images such as animated images or video, audio, video games, or a combination thereof, or any other suitable type of digital media as will be apparent to persons having skill in the relevant art. The server 110 and the content provider 106 may be any type of processing device capable of performing the functions as disclosed herein, such as a general purpose computer, a general purpose computer configured as disclosed herein to become a specific purpose computer, etc. The processing device may be a single system (e.g., a single specific purpose computer) or may be comprised of several interconnected (e.g., physically or through a network) systems or servers (e.g., a server farm). In one embodiment, the server 110 may be the system 900 of FIG. 9.

The consumer device 102 may include the display 102 and be configured to display the digital media 108 to a consumer. As discussed in more detail below, the consumer device 102 may be configured to indicate when a product displayed in the digital media 108 is available for purchase. The consumer device 102 may be further configured to receive an indication from a user identifying a product selected from the digital media 108. Upon receiving the indication, the consumer device 102 may, as discussed in more detail below, display product details for the selected product (e.g., and retrieved from the product database 112).

Consumer Device

Figure 2:
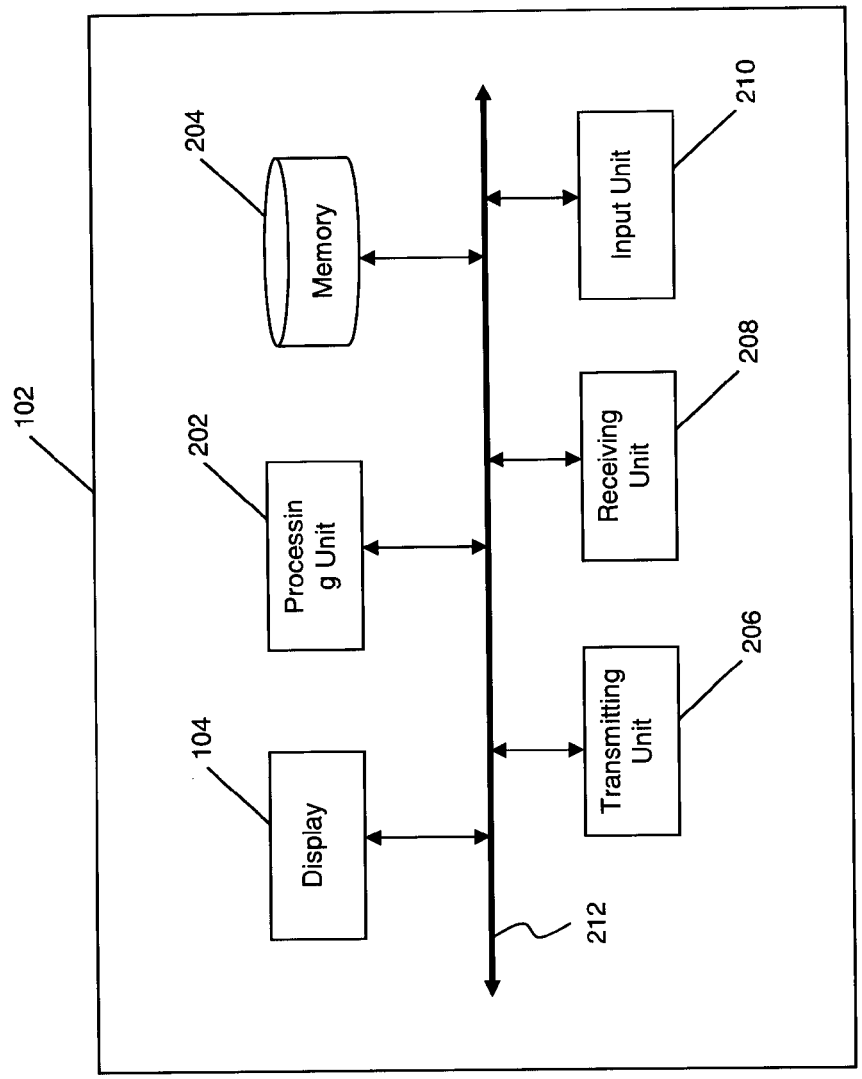
FIG. 2 is a block diagram illustrating a consumer device for displaying product information for a product available for purchase in digital media in accordance with exemplary embodiments.

FIG. 2 illustrates one embodiment of the consumer device 102. The consumer device 102 may include the display 104, a processing unit 202, memory 204, a transmitting unit 206, a receiving unit 208, and an input unit 210. Each of the components of the consumer device 102 may be connected via a bus 212. Suitable types and configurations of the bus 212 will be apparent to persons having skill in the relevant art. The consumer device 102 may be any processing device suitable for performing the functions as disclosed herein, such as a desktop computer, a laptop computer, a cellular phone, a smart phone, a tablet computer, a slate computer, a smart television, etc.

The display 104 may be any display suitable for displaying the digital media 108. In one embodiment, the display 104 may be a capacitive touch display, for example. Alternatively, the display 104 can be a monitor or TV screen electronically coupled to a second screen with an associated input device, such as a touch screen tablet computer, as explained below. The processing unit 202 may be any processing unit capable of performing the functions as disclosed herein. The memory 204 may be any suitable type of memory (e.g., read-only memory, random access memory, etc., using any suitable memory technology (optical, magnetic, solid state, etc.) and may be configured to store commands or instructions for execution by the processing unit 202.

The processing unit 202 may be configured to detect whether the digital medial 108 displayed by the display 104 includes an indication that at least one product appearing in the digital media 108 may be available for purchase. In one embodiment, products available for purchase in the digital media 108 may be indicated in the product index 109, as discussed in more detail below. The processing unit 202 may be further configured to cause the display 104 to display the indication on digital media 108. In one embodiment, a product in the digital media 108 available for purchase may be indicated by a glow emanating from the product or the product being outlined. In an alternative embodiment, the available product may have a symbol or marking overlaid on the product. Any form of highlighting can be used, and its selection is likely dependent on visual impact on a particular implementation.

The input unit 210 may be configured to receive input from a user. The input unit 210 may be any type of device suitable for receiving input from a user as will be apparent to persons having skill in the relevant art, such as a mouse, keyboard, touch-based input, etc. In one embodiment, the input unit 210 and the display 104 are combined as a capacitive touch display. In a further embodiment, a user may input using touch-based gestures. The processing unit 202 may be configured receive, via the input 210, an indication of a selected product of the available products displayed in the digital media 108. The indication may be based on the location of a user input and the display location of each product in a product index associated with the digital media 108, as discussed in more detail below.

The processing unit 202 may be configured to retrieve product details, as discussed in more detail below, corresponding to the selected product. In one embodiment, the product details may be retrieved from the product database 112 (e.g., via the network 116). In another embodiment, the product details may be stored in the memory 204 in the consumer device 102. In an alternative embodiment, the product database 112 may be included as part of the memory 204 in the consumer device 102. The processing unit 202 may also be configured to display, on the display 104, the retrieved product details corresponding to the selected product.

In one embodiment, the consumer device 102 may include the transmitting unit 206. The transmitting unit 206 may be configured to transmit a request for additional product details, discussed in more detail below. The consumer device 102 may also include the receiving unit 208, which may be configured to receive the requested additional product details. The processing unit 202 may be configured to display the additional product details on the display 104.

In some embodiments, the consumer device 102 may also include a camera. The processing unit 202 may be configured to cause the display 104 to display an area being viewed with the camera, such as signage at a store, shopping mall or mart. The processing unit 202 may be configured to display a picture as taken with the camera or a live view of the camera. In some embodiments, the picture or view displayed via the camera may be or may be used as the digital media, where a user may indicate a product using the input unit 210 and image recognition processing as discussed below.

Product Data Sets

Figure 3:
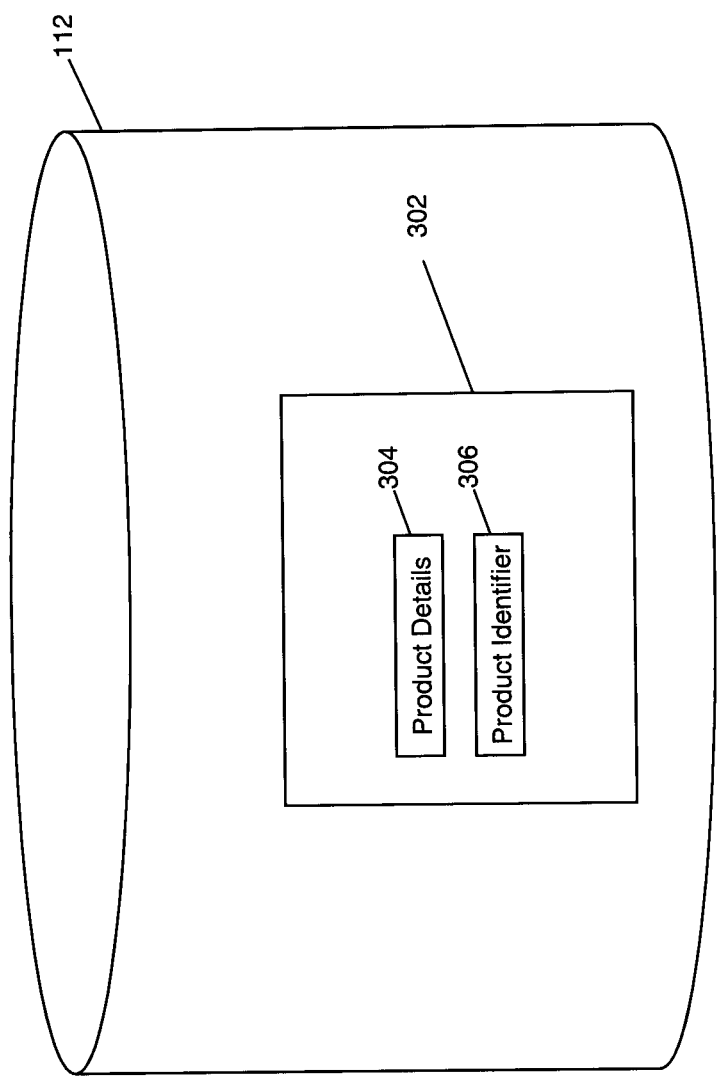
FIG. 3 is a block diagram illustrating a product data set in accordance with exemplary embodiments.

FIG. 3 illustrates the product database 112, which may be included as part of the server 110. In one embodiment, the product database 112 may be stored on the consumer device 102 (e.g., in the memory 204). In some embodiments, a separate product database may be stored in the consumer device 102, and be updated regularly with information stored in the product database 112 (e.g., via the network 116). Other suitable arrangements for storing information included in the product database 112 will be apparent to persons having skill in the relevant art.

The product database 112 may include a plurality of product data sets 302. Each product data set 302 may include at least product details 304 and a product identifier 306. The product identifier 306 may be any identifier that corresponds to a product (e.g., a good or service) available for purchase. Exemplary product identifiers may include a universal product code (UPC), a manufacturer part number (MPN), a European article number (EAN), an international standard book number (ISBN), or a number or other identifier unique to the corresponding product. In one embodiment, the type of product identifier 306 may be determined by the server 110 or an entity that operates the server 110.

The product details 304 may include details about the corresponding product available for purchase. Exemplary product details 304 may include pricing information, purchasing information, merchant information, sizing information, quantity information, etc. In one embodiment, the user of the consumer device 102 may select (e.g., request) the display of specific product details 304. In a further embodiment, the consumer device 102 may store (e.g., in the memory 204) user preferences for the product details 304.

In an exemplary embodiment, the product details 304 may include information to at least initiate a transaction for the corresponding product available for purchase. In one embodiment, the product details 304 may include information for initiating a transaction with an online merchant directly from the consumer device 102. In an alternative embodiment, the product details 304 may include at least one physical location of at least one merchant offering the corresponding product for purchase. In a further embodiment, the at least one merchant and/or the at least one physical location may be based on the geographic location of the consumer device 102 (e.g., the closest merchant or merchants to the consumer that sell the product). In an even further embodiment, the product details 304 may include at least pricing and stock information relating to each of the merchants and/or physical locations (e.g., and comparisons of pricing, stock, and/or location information between merchants). In another embodiment, the product details 304, when displayed (e.g., on the display 104) may enable the user of the consumer device 102 to purchase the corresponding product while concurrently displaying the digital media 108.

In one embodiment, the product details 304 may include a merchant group identifier. The merchant group identifier may be associated with a plurality of merchants (e.g., retailers) that have the corresponding product available for purchase. In such an embodiment, the user of the consumer device 102 may initiate a financial transaction for a product displayed in the digital media 108, and the server 110 may, using the merchant group identifier, identify a merchant or merchants (e.g., the product provider 114) with which the user may conduct the financial transaction. In one embodiment, the server 110 may identify a merchant or merchants based on a geographic location (e.g., the location of the consumer device 102 as established by any suitable means, a shipping address provided by the user, etc.), user preferences, a sales agreement (e.g., between the plurality of merchants and a manufacturer, such as the product provider 114), etc.

In some embodiments, the server 110 may identify a merchant based on a user profile or user transaction history. For example, if a user is identified as valuing time as a factor in making a purchase, the server 110 may identify a merchant with the fastest processing and/or shipping time, whereas if the user is identified as valuing price as a factor, the server 110 may instead identify the merchant with the best purchase and/or shipping prices. In one embodiment, merchants may bid to be identified by the server 110 to participate in the financial transaction, such as by using financial bids. Alternatively, or as part of a merchant selection algorithm, merchant selection can be based on multiple factors, including being based in whole or in part on positive customer reviews. In another embodiment, a consumer may enter a desired price (e.g., or a discount, deal, etc.) for a product, and may purchase that product for the desired price from a willing merchant (e.g., based on merchant acceptance, merchant bidding, etc.). Methods for identifying a merchant to participate in the transaction will be apparent to persons having skill in the relevant art, and include listings, pop-ups, hyperlinks, etc.

User Interface for Displaying Digital Media on a Consumer Device

FIGS. 4A and 4B illustrate an exemplary graphical user interface for displaying the digital media 108 on the display 104 of the consumer device 102. In one embodiment, the digital media 108 may be displayed using an application program (e.g., stored in the memory 204 and executed by the processing unit 202).

As illustrated in FIG. 4A, the digital media 108 may include a plurality of content items 402. It will be apparent to persons having skill in the relevant art that the content items 402 illustrated in the digital media 108 is for the purposes of example only. In some instances, content in the digital media may overlap or otherwise be obscured (e.g., as in a magazine spread, motion picture image, movie, etc.) or may be audible (e.g., as in digital audio media), etc., as will be apparent to persons having skill in the relevant art. For example, the various boxed in FIGS. 4A and 5A can be various objects or people in a given scene of a still image or a moving image, or separate parts of a page or collage of electronic print media, for example.

The digital media 108 may also include at least one product available for purchase, such as an available product 404. In an exemplary embodiment, the processing device 202 may detect whether the digital media 108 includes at least one product (e.g., the available product 404) appearing in the digital media 108 that may be available for purchase. In one embodiment, the detection may be performed by an application program on the consumer device 102 (e.g., and stored in the memory 204). In some embodiments, detecting may be performed by identifying a product index (e.g., the product index 109) associated with the digital media 108. Devices that are not enabled with functionality disclosed herein can display the content in its normal state, which is distinct from missing advertisements in dedicated advertisement space, etc.

In an exemplary embodiment, a first application program may display the digital media 108 on the display 104 and a second application program may detect whether the digital media 108 displayed by the first application program includes at least one product available for purchase. The second application program may be further programmed to indicate that the available product 404 is available for purchase. In such an embodiment, if the consumer device 102 does not include the second application program, the digital media 108 (e.g., and more specifically the available product 404) may be displayed without any indication of products available for purchase in the digital media 108. In a further embodiment, the consumer device 102 (e.g., or the first application program) may prompt the user to install (e.g., download) the second application program on the same device and/or a second device (e.g., a "second screen") in order to receive indications and purchase available products.

In one embodiment, the availability of the available product 404 may be indicated by an outline, such as the outline 406 illustrated in FIG. 4B. In another embodiment, the availability may be indicated by a glow or other highlighting technique. In yet another embodiment, the availability of the available product 404 may be indicated subsequent a user command. In a further embodiment, the user command may include user interaction with a button displayed on the display 104 or a button on the consumer device 102. In another further embodiment, the user command may be a voice command, such as the user saying "I want" or "buy now" or the like to a consumer device 102 configured to receive voice commands. It may be that the consumer device 102 might need to be prompted to listen, such as by the pressing of a dedicated physical, touchscreen, or imaged activation button, depending on the consumer device's 102 design, or might be placed in listening mode when displaying available products 404, or might be continuously listening for key words, or other suitable mechanisms. Other types of indications of the availability of the available product 404 will be apparent to persons having skill in the relevant art.

In some embodiments, the availability of the available product 404 may be indicated by a displayed listing of at least the available product 404 (e.g., or the product index 109). In a further embodiment, the displayed listing may be displayed concurrently with the digital media 108. In embodiments where the available product 404 may not always be visible to the user of the consumer device 102 (e.g., if the digital media 108 is a movie and the available product 404 is only displayed for a portion of the movie), the available product 404 may only be indicated as available when actually displayed on the display 104. For example, if the available product 404 is displayed during a single scene in a movie, an indicator (e.g., a displayed listing of the available product 404) may be displayed during the scene where the available product 404 is displayed, and may no longer be displayed when the available product 404 is no longer displayed.

Product Index

FIG. 5B illustrates a sample product index 109, noting the product index would likely include more information and/or images in a commercial setting. In one embodiment, the product index 109 may be embedded (e.g., encoded) in the digital media 108 or included in an application program configured to display the digital media 108 (e.g., and stored in the memory 204 of the consumer device 102). In an alternative embodiment, the product index 109 may be included in the content provider 106 (e.g., and accessed by the consumer device 102 via the network 116). In another embodiment, the product index 109 may be included in the server 110.

The product index 109 may be an index of products available for purchase in a corresponding digital media (e.g., the digital media 108). For example, the product index 109 illustrated in FIG. 5B includes three products available for purchase, products 510, 512, and 514, and corresponds to the digital media 108 illustrated in FIG. 5A, which includes three available products 404a, 404b, and 404c. Each product in the product index 109 may include at least a product identification number 504 and a display location 508. In one embodiment, each product may also include a product name 506.

The product identification number 504 may be any identifier that corresponds to the product in the product index 109. Exemplary product identification numbers 504 may include universal product code (UPC), manufacturer part number (MPN), European article number (EAN), international standard book number (ISBN), or any number or other identifier unique to the corresponding product. In one embodiment, the type of product identification number 504 may be determined by the server 110, an entity that operates the server 110. In another embodiment, the type of product identification number 504 may be determined by the content provider 106, and each product data set 302 in the product database 112 may include the product identification number 504 associated with the corresponding product.

The display location 508 may be the location of the corresponding product displayed in the digital media 108 and may be shown as an image (e.g., thumbnail) of the image on that particular location. The display location 508 may be any type of location suitable for performing the functions as disclosed herein. For example, the display location 508 may be the physical location of the product in the digital media 108, as illustrated in FIGS. 5A and 5B. In that example, the product 510 has a display location of "Page 1, Cell 1," corresponding to the available product 404 a, which is displayed in the first cell of the first page of the digital media 108. In one embodiment, the display location 508 may be the location of the product in relation to the display 104. In some embodiments, the display location 508 may include multiple display locations (e.g., corresponding to four corners of a rectangle encompassing the corresponding product). In other embodiments, the display location 508 may be a measurement of time (e.g., an elapsed amount of time in a movie or audio file) and may further include a location within the moving picture image, as appropriate to assist in authoritatively identifying the product. Other suitable types of display locations 508 will be apparent to persons having skill in the relevant art.

User Interface for Displaying Product Information on a Consumer Device

As discussed above, the processing device 202 may receive (e.g., via the input unit 210) an indication from a user of the consumer device 102 identifying a selected product included in the digital media 108. The selected product may be identified based on the location of the user input and the display locations 508 of the products in the product index 109. For example, as illustrated in FIGS. 5A and 5B, if the location of the user input is detected (e.g., by the input unit 210) as being in Cell 1 of the digital media 108, then the selected product would be product 510, due to its display location 508 being Cell 1.

In one embodiment, the selected product may be identified by image detection (e.g., using techniques that can isolate discrete objects, often through edge detection or the like) and image searching, by methods that will be apparent to persons having skill in the relevant art. For example, the processing device 202 may receive an indication of the user input (e.g., from the input unit 210, such as a tap on a touch screen over the displayed object) and may, using edge detection, detect a product displayed in the digital media 108, crop, or otherwise extract the selected image and searching for the image using an image searching function. The processing device 202 may use the image searching to identify at least an identifier (e.g., the product identification number 504 or the product identifier 306) corresponding to the detected product, and optionally looking up where the product can be purchased. This embodiment does require pre-tagging (e.g., indexing) objects in the media, which could nevertheless still be done to allow for one or the other technique to be employed. That is, one application or functionality for instance can be used in conjunction with tagged media, and another used for objects that are not tagged in the media or media that is not tagged.

In such an embodiment where image detection may be used, the digital media 108 may be a picture taken with a camera of the consumer device 102, or may be a live feed of what is being viewed with the camera of the consumer device 102. For example, the user may be in a mall and see an advertisement or a product in a display or on a rack and want additional details. The user may take a picture or view the product or advertisement using a camera of the consumer device 102. The user may indicate the product, which may be identified via edge detection and image detection. In one embodiment, the consumer device 102 may actively use edge detection and image detection to identify products prior to user indication and indicate to the user the ability to select the product by methods as disclosed herein.

As discussed above, after receiving the indication identifying the selected product, the processing device 202 may retrieve product details 304 associated with the corresponding product (e.g., based on the associated product identification number 504 and the associated product identifier 306). The retrieved product details 304 may be displayed in the product details window 602, as illustrated in FIG. 6. In one embodiment, the product details window 602 may be displayed concurrently with the digital media 108. In a further embodiment, the product details 304 may enable a user of the consumer device 102 to initiate and conduct a financial transaction for the corresponding product in the product details window 602. In one embodiment, a user of the consumer device 102 may be enabled by the product details 304 to save the selected product to a list (e.g., a wish list), which may be further configured to enable the user to purchase the selected product at a later time.

In some embodiments, the product details 304 may enable a user of the consumer device to share the selected product with a social network (e.g., Facebook, Twitter, etc.) or through e-mail. For example, the product details window 602 may include a "Share" button that may, when selected by the user, post to a social network on the user's behalf that the user viewed (e.g., shared, recommended, etc.) the selected product, the digital media 108, the product details 304, or other information as will be apparent to persons having skill in the relevant art. In a further embodiment, the user of the consumer device 102 may be prompted to share with a social network upon the conducting of a financial transaction for the selected product. For example, if a user is viewing a magazine on the consumer device 102 and purchases a designer handbag included in the magazine, the user may share the purchase of the handbag with their preferred social network. In some instances, social network information may be stored (e.g., in the memory 204) on the consumer device 102 to facilitate social network sharing.

In one embodiment, the consumer device 102 may be configured to enable a user to share with a social network the saved list (e.g., the user's wish list) of selected products. In a similar embodiment, the consumer device 102 may be configured to identify saved product lists of other users (e.g., in the social network of the user of the consumer device 102), and may be further configured to indicate (e.g., on the display 104) products in the digital media 108 that appear on the saved product lists of other users. For example, a product available for purchase in the digital media 108 may be indicated as available for purchase, and may be further indicated that someone in the user's social network has the product on their wish list, which could be beneficial for the purchase of gifts (e.g., for birthdays, holidays, anniversaries, etc.). In a further embodiment, the consumer device 102 may be configured such that the user may conduct a transaction for the selected product on behalf of a friend selected by the user (e.g., that saved the selected product to their wish list), such as by enabling the user to purchase the selected product and have it shipped to the friend as a gift (e.g., and using shipping information provided by the friend to their respective consumer device). In one embodiment, the consumer device 102 may be configured to display reviews or comments (e.g., 4 out of 5 stars, recommended buy, do not pay more than $20 for this item, wait for a sale, etc.) of the selected product by other users, by members of the user's social network, or both (e.g., users give the product 3 out of 5, your friends rate it 4 out of 5).

Second Screen Embodiments

In an exemplary embodiment, the receiving an indication identifying a selected product and displaying the product details window 602 may be performed by a second application program on the consumer device 102 (e.g., and stored in the memory 204), which may be separate from a first application program programmed to display the digital media 108. This is particularly useful for second screen applications, such as the first screen being a television and the second screen being a tablet computer, for instance. In this way, entertainment such as a movie or show may be displayed on the television, and the second screen tablet display product information and carry out purchases. The entertainment data file or stream might be tagged with metadata or index data that is conveyed during, before or after the entertainment to the second screen device for displaying product information, etc. The second screen device can accent highlighting (as explained above) on the first screen, or might simply show products that were displayed are currently displayed or are going to be displayed in a stream or the like. The product data (e.g., product identification tags) can be provided as embedded data that may not otherwise be apparent in the entertainment (e.g., metadata), but alternatively may be provided by an external source, such as a third party that has annotated the entertainment via a different communication channel, such as by timing, listening for audio clues of what is being displayed via the second screen device, through a communication channel from a device that assures some measure of synchronization. This embodiment is particularly conducive to environments that involve set top boxes, such as game consoles or other mechanisms which provide computing and communication capabilities to a television monitor. This could be real time, near real time, or just an index of products that is part of the entertainment program, perhaps with an indication of when or scene in which it will be/was displayed.

Figure 7A:
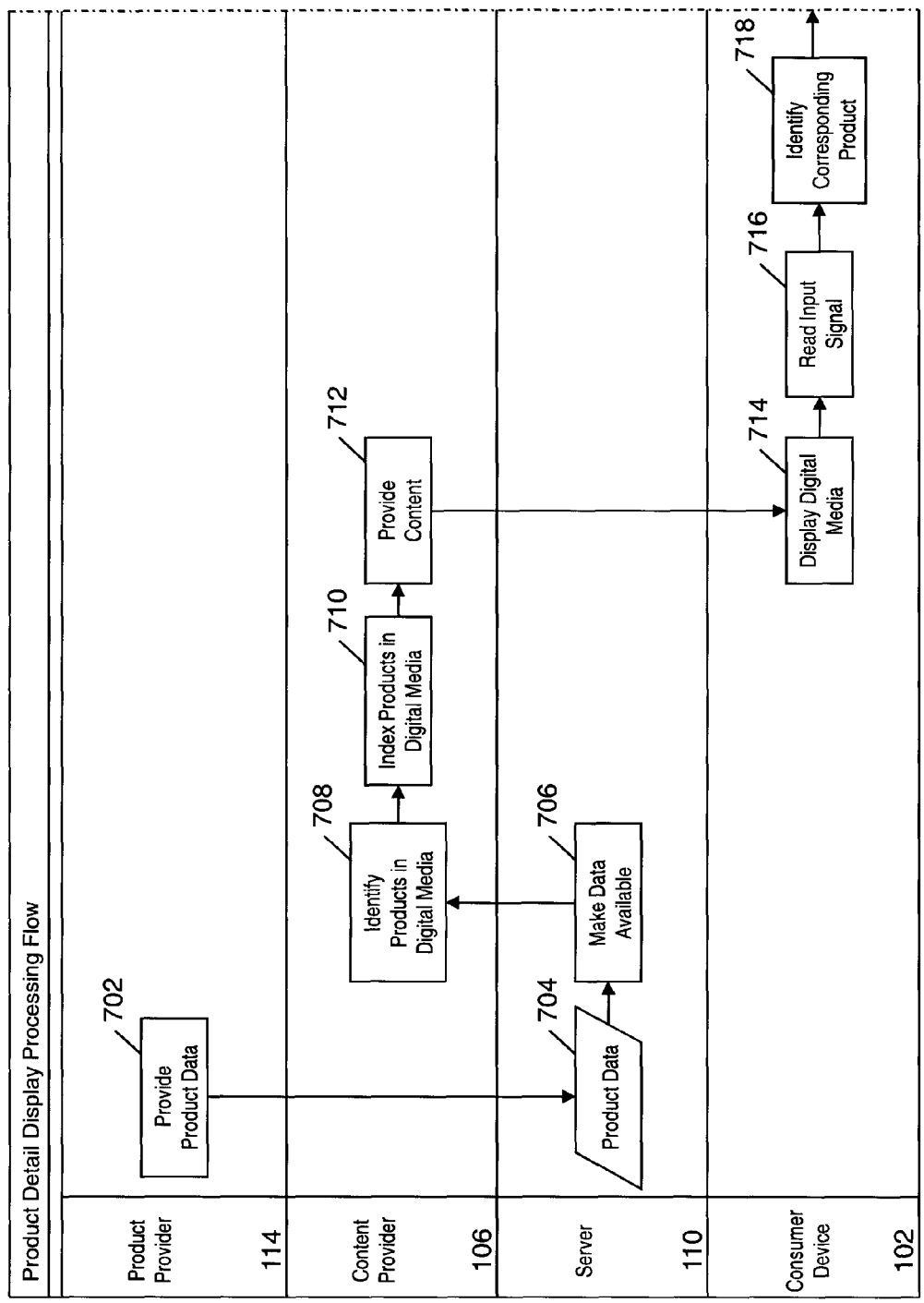
FIGS. 7A and 7B are a flow diagram illustrating an method for displaying product information on a consumer device in accordance with exemplary embodiments.
Figure 7B:
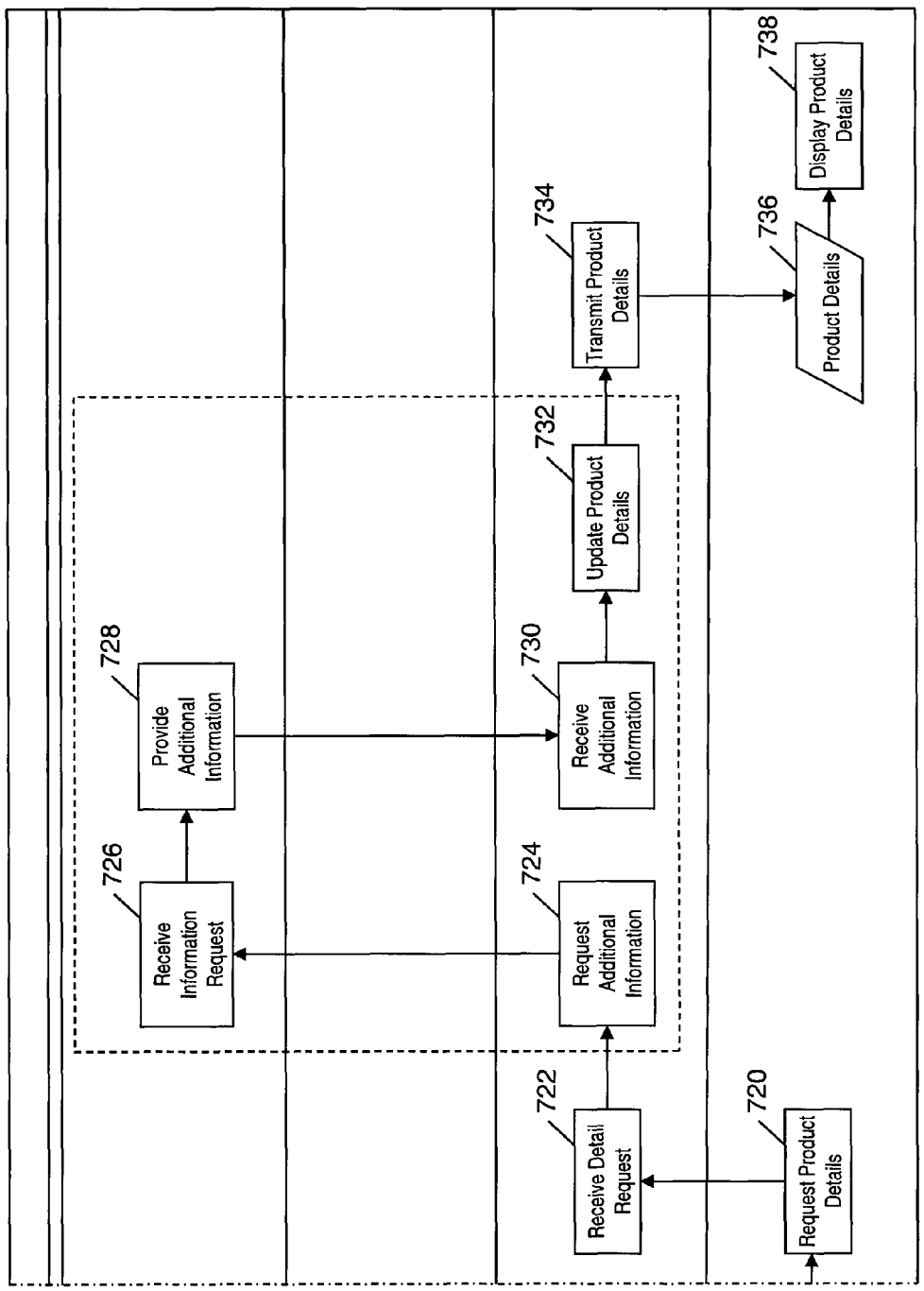

FIGS. 7A and 7B illustrate exemplary second screen displays, which includes a user guide (upper left), branding or other advertisement space, and three columns of information, in this exemplary embodiment. The first might be tweets, Facebook or other social media messaging among friends or the like, the center in this example show advertisements on what was, is or will shortly be on the main (e.g. TV) screen. If a jersey is worn by a player being interviewed, or pizza shown being eaten in a scene of a broadcast TV show, or a flashlight show in a thriller, they can be presented for purchase by the viewer in-app on the second screen, so that the first screen presents the media in its original state, with or without highlighting or other indicia of the ability to purchase an item.

However, it will also be apparent to persons having skill in the relevant art that the first application program and the second application program may be implemented as functions of a single program on a single device, or configured as a single app or program, which may also be configured to perform additional functions, such as web browsing, etc. Other suitable implementations of the functions as discussed herein will be apparent to persons having skill in the relevant art.

In an embodiment including a first and second application program, the digital media 108 may be displayed on any consumer device 102 including the first application program. If the consumer device 102 also included the second application program, then the second application program could detect products available for purchase in the digital media 108 and allow the user to identify available products and display product details or conduct a purchase for the identified products.

In some instances, the first application program may include the product index 109 associated with the digital media 108 to be displayed. The second application program could detect the products included in the digital media 108 based on the product index 109. In other instances, the product index 109 may be stored external to the consumer device 102 (e.g., by the content provider 106 or the server 110), and may include information identifying the corresponding digital media 108. The second application program could identify the digital media 108 being displayed by the first application program, and then identify the corresponding product index 109 to detect for products available for purchase.

In such an embodiment, the first application program would not need to include programming to enable a user of the consumer device 102 to initiate or conduct a financial transaction for an included product. Instead, the first application program would only need to include, at most, the product index 109 corresponding to the digital media 108 to be displayed. This would allow content providers (e.g., the content provider 106) to enable consumers to purchase products included in provided content (e.g., magazines, pictures, movies, songs, etc.) by tagging the products (e.g., including the product in the product index 109), without the need to include programming for transactions in the application program.

In some embodiments, the processing device 202 (e.g., or the second application program as in the above embodiment) may be configured to report (e.g., to a third party, such as the server 110) information based on the displayed digital media 108 and received user indications. For example, the processing device 202 may report information when a user indicates a selected product to display its corresponding product details 304, such as information regarding the selected product (e.g., the product identifier 306), the digital media 108 where the product was displayed (e.g., at the display location 508), and, if consented to by the user of the consumer device 102, information on the user (e.g., demographic information provided by the user). In some instances, the processing device 202 may report (e.g., instead, or in addition to prior reporting) when a user shows interest in a particular product or product type, initiates, and/or conducts a financial transaction for the selected product. Such information may be useful as a business analytics tool and provide beneficial marketing and advertising research that may be unavailable in traditional systems for viewing product details and purchasing products, as is conventional, but has the additional advantage of showing interests in context. For instance, it might be relevant that the media being viewed relates to a given topic (e.g., hunting) and the product being reviewed is a sweater, which would tell a potential marketer something different than if the same sweater was being reviewed in the context of media about something that would not normally be thought of as being related to the given topic, e.g., fashion. It will be apparent to persons having skill in the relevant art that such information may be useful to identify consumer behaviors, sales trends, channel effectiveness, return on investment, segmentation, targeted consumer strategy, etc.

In some embodiments, an application program configured to display the digital media 108 may also be configured to store (e.g., in a database local to the consumer device 102 or accessed via the network 116) coupons directed to products available for purchase in the digital media 108. In a further embodiment, the product details window 602 may include coupons that are available for use for the selected product. For example, the product details window 602 may display the product details 304 as well as a coupon that may be used for the corresponding product (e.g., based on the product or the identified merchant). In some instances, the product details window 602 may allow for a coupon to be selected and a financial transaction initiated for the selected product.

Method for Displaying Product Information on a Consumer Device

FIGS. 7C and 7D illustrate a processing flow for displaying product information on a consumer device (e.g., the consumer device 102) using the system 100 of FIG. 1.

In step 702, a product provider (e.g., the product provider 114), provides product data to a server (e.g., the server 110), which may store the product data (e.g., in the product database 112) in step 704. The product data may include at least a product identifier (e.g., the product identifier 306) and product details (e.g., the product details 304) corresponding to each of a plurality of products available for purchase. The product details may include at least information to at least initiate a transaction for the corresponding product, such as merchant information, a merchant address, and pricing information.

In step 706, the server 110 may make the product data in the product database 112 available to a content provider (e.g., the content provider 106). In one embodiment, the content provider 106 may be a merchant, a retailer, or any other entity that offers products for purchase. In step 708, the content provider 106 may identify products (e.g., that are included in the product database 112) included in a digital media (e.g., the digital media 108). In one embodiment, the digital media is at least one of: still images or advertisements, moving picture images, animated images, video games, and audio as explained above. For example, the content provider 106 may identify consumer products available for purchase advertised in a digital magazine.

In step 710, the content provider 106 may index the identified products in a product index (e.g., the product index 109). The product index 109 may include, for each product in the product index 109, at least a product identification number (e.g., the product identification number 504) and a display location (e.g., the display location 508). In one embodiment, each product may also include a product name (e.g., the product name 506). In one embodiment, the product identification number 504 may be at least one of: a universal product code (UPC), manufacturer part number (MPN), international standard book number (ISBN), European article number (EAN), and a product identifier that is unique to the corresponding product as explained above. The display location 508 may be a location of the product in the displayed digital media 108. In one embodiment, the physical location may be with reference to the display (e.g., the display 104) of the consumer device 102. In an exemplary embodiment, the product index 109 may be included in the digital media 108, such as by encoding, embedding, or any other process suitable for performing the functions disclosed herein as will be apparent to persons having skill in the relevant art.

In step 712, the content provider 106 may provide the content (e.g., the digital media 108 and included product index 109) to the consumer device 102. In one embodiment, the content may be provided over a network (e.g., the network 116). In step 714, the consumer device 102 may display the digital media 108 (e.g., on the display 104). In one embodiment, the consumer device 102 (e.g., via the processing device 202), detects products available for purchase included in the digital media 108. In a further embodiment, the consumer device 102 indicates, on the display 104, the products available for purchase in the digital media 108. In an even further embodiment, the indication of a product available for purchase is a glow surrounding the product. In an alternative embodiment, the indication of a product available for purchase may be made in response to a user command. In a further embodiment, the user command may be a voice command. In an alternative further embodiment, the user command may be user interaction with a button on the display 104 or on the consumer device 102 as explained above.

In step 716, the processing device 202 of the consumer device 102 reads (e.g., via the input unit 210) an input signal from a user of the consumer device 102. In one embodiment, the display 104 is a capacitive touch display and the input signal is a touch-based gesture on the capacitive touch display. In step 718, the processing device 202 identifies a selected product out of the products available for purchase based on at least one of: the input signal and the display locations 508 of the products available for purchase included in the digital media 108 (e.g., and stored in the product index 109), and the input signal and a list of the products available for purchase from a display of the product index 109.

In step 720, the consumer device 102 requests product details for the selected product from the server 110, which receives the request in step 722. The request for product details may include at least the product identification number 504 associated with the selected product. The server 110 may request additional information from the product provider 114, in step 724. The request for additional information may include at least the product identification number 504 or product identifier 306 associated with the selected product.

In step 726, the product provider 114 may receive the request for additional information. The product provider 114 may identify the additional information based on the request. In one embodiment, the product provider 114 may identify updated pricing, availability, and/or purchasing information for the selected product. In another embodiment, the product provider 114 may identify information to at least initiate and conduct a transaction for the selected product between the product provider 114 and a user of the consumer device 102. In step 728, the product provider 114 may provide the requested additional information to the server 110, which may receive the additional information in step 730. In step 732, the server 110 may update the product details 304 for the selected product in the product database 112 by including the additional information. It will be apparent to persons having skill in the relevant art that steps 724 to 732 may be optional, and may be performed in instances where the server 110 updates the product details 304 prior to responding to the product detail request.

In step 734, the server 110 may transmit the product details 304 from the product database 112 to the consumer device 102, which may receive the product details 304 in step 736. Then, in step 738, the consumer device 102 may display the received product details 304 on the display 104 of the consumer device 102. In one embodiment, the product details 406 product details 304 may be displayed on the display 104 concurrently with the digital media 108. In an exemplary embodiment, the display of the product details 406 product details 304 may enable a user of the consumer device 102 to conduct a financial transaction for the selected product. In a further embodiment, the server 110 may identify a merchant, merchants, merchant group, or merchant groups (e.g., the content provider 114) to participate in the financial transaction. In one embodiment, a user of the consumer device 102 may be further provided with an option to save the selected product (e.g., in a shopping cart) for purchase at a later time.

Server Architecture

Figure 8:
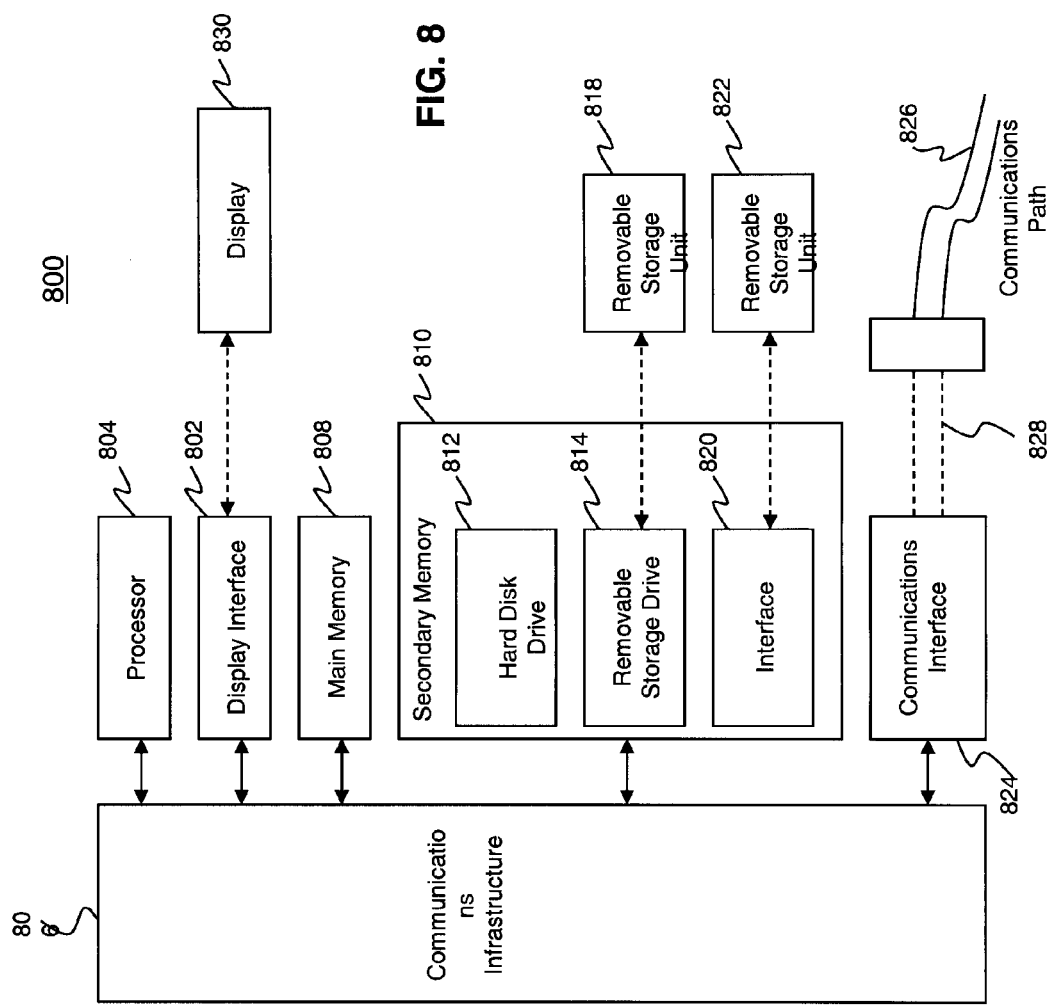
FIG. 8 is a block diagram illustrating an exemplary computer system for use in the system of FIG. 1 in accordance with exemplary embodiments.

FIG. 8 illustrates a computer system 800 in which embodiments of the present disclosure, or portions thereof, may be implemented as computer-readable code. For example, the server 110, content provider 106, or portions of the consumer device 102, of FIG. 1 can be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 7A, 7B, 9, and 10.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores."

The terms "computer program medium," "non-transitory computer readable medium," and "computer usable medium" as discussed herein are used to generally refer to tangible media such as a removable storage unit 818, a removable storage unit 822, and a hard disk installed in hard disk drive 812. For example, if the removable storage drive 814 is a floppy disk drive, the removable storage unit 818 may be a floppy disk. In one embodiment, the removable storage unit 818 may be non-transitory computer.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. The processor device 804 may be connected to a communication infrastructure 806, such as a bus, message queue, network (e.g., the network 116), multi-core message-passing scheme, etc. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

Computer program medium and computer usable medium may refer to memories, such as the main memory 808 and secondary memory 810, which may be memory semiconductors (e.g. DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 7A, 7B, and 9-10 as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

Exemplary Method for Displaying Product Information on a Consumer Device

Figure 9:
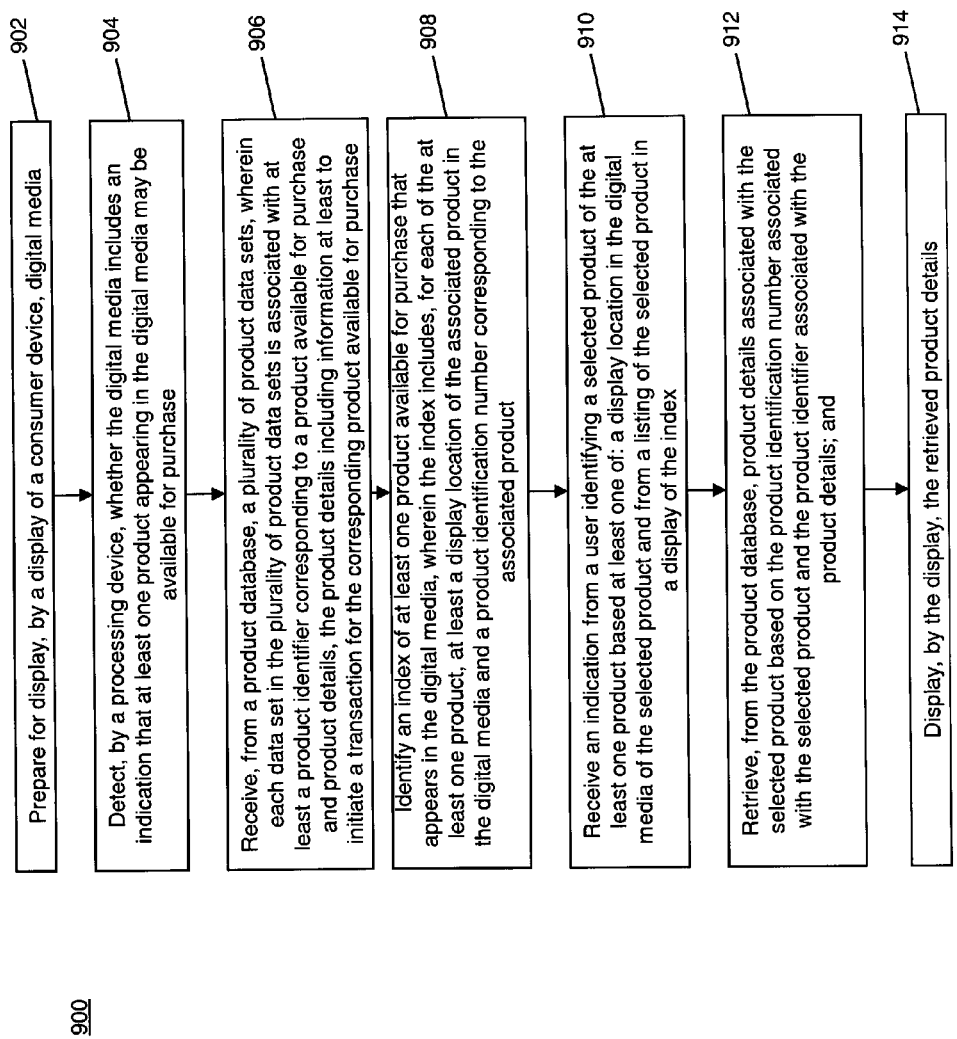
FIG. 9 is a flow chart illustrating an exemplary method for displaying product information on a consumer device in accordance with exemplary embodiments.

FIG. 9 illustrates a method 900 for displaying product information on a consumer device (e.g., the consumer device 102).

In step 902, digital media (e.g., the digital media 108) may be prepared for display by a display (e.g., the display 104) of the consumer device 102. In some embodiments, a first application program (e.g., stored on the consumer device 102) may prepare the digital media 108 for display on the consumer device 102. In one embodiment, the digital media 108 may be at least one of: still images or advertisements, moving picture images, animated images, video games, and audio.

In step 904, a processing device (e.g., the processing device 202) may detect whether the digital media 108 includes an indication that at least one product appearing in the digital media 108 may be available for purchase. In one embodiment, the processing device 202 may be a second application program located on the consumer device 102. In one embodiment, the display 104 may indicate the detected at least one product in the digital media 108 that may be available for purchase. In some embodiments, the processing device 202 may perform the detection by detecting (e.g., header information or metadata) information included in the digital media 108. In alternative embodiments, the processing device 202 may detect information embedded in the digital media 108.

In step 906, a plurality of product data sets may be received from a product database (e.g., the product database 112), wherein each data set (e.g., the product data set 302) in the plurality of product data sets may be associated with at least a product identifier (e.g., the product identifier 306) corresponding to a product available for purchase and product details (e.g., product details 304), product details 304 including information at least to initiate a transaction for the corresponding product available for purchase. In some embodiments, receiving the plurality of product data sets may be as a result of the detecting whether the digital media 108 includes an indication of products available for purchase. In one embodiment, the plurality of product data sets may be embedded in the digital media 108. In one embodiment, the product identifier 306 may be at least one of: a universal product code, a manufacturer part number, a serial number, an international standard book number, a European article number, and a product identifier unique to the corresponding product as examples.

In one embodiment, each product data set 302 may further include at least one of: product description, purchase information, merchant information, sizing information, and quantity information. In one embodiment, the information to at least initiate the transaction may include information as to where the corresponding product can be purchased at a physical location. In an alternative embodiment, the information may include information as to where the corresponding product may be purchase online (e.g., via the network 116). In some embodiments, the information may further include at least one of: funding information and shipping information.

In step 908, an index (e.g., the product index 109) of at least one product available for purchase in the digital media 108 may be identified, wherein the product index 109 may include, for each of the at least one product, at least a display location (e.g., the display location 508) of the associated product in the digital media 108 and a product identification number (e.g., the product identification number 504) corresponding to the associated product.

In step 910, an indication from a user identifying a selected product of the at least one product may be received based on at least one of: a display location in the digital media of the selected product and from a listing of the selected product in a display of the product index 109. In one embodiment, the display 104 may be a capacitive touch display and the indication from a user may be a touch-based gesture on the capacitive touch display. In a further embodiment, the touch-based gesture may be on the selected product as displayed in the digital media 108.

In step 912, product details may be retrieved from the product database 112, wherein the product details are associated with the selected product based on the product identification number 504 associated with the selected product and the product identifier 306 associated with the product details 304. In some embodiments, retrieving the product details may further include transmitting, by a transmitting device (e.g., the transmitting unit 206), a request for additional product information, the request for additional product information including at least the product identification number 504 corresponding to the selected product and receiving, by a receiving device (e.g., the receiving unit 208), additional product information corresponding to the selected product. In further embodiments, the additional product information may be furnished by a product provider (e.g., the product provider 114).

In step 914, the retrieved product details may be displayed by the display 104 of the consumer device 102. In one embodiment, the retrieved product details may be displayed concurrently with the digital media 108. In some embodiments, the method 900 may further include adding at least the product identifier 306 and/or the product identification number 504 associated with the selected product to a list of desired products for a later purchase of the selected product. In some embodiments, the method 900 may further include reporting at least the product identifier 306 and/or the product identification number 504 associated with the selected product and the digital media 108. In further embodiments, the reporting may be to a third party.

Exemplary Method for Distributing Digital Media to a Consumer Device

Figure 10:
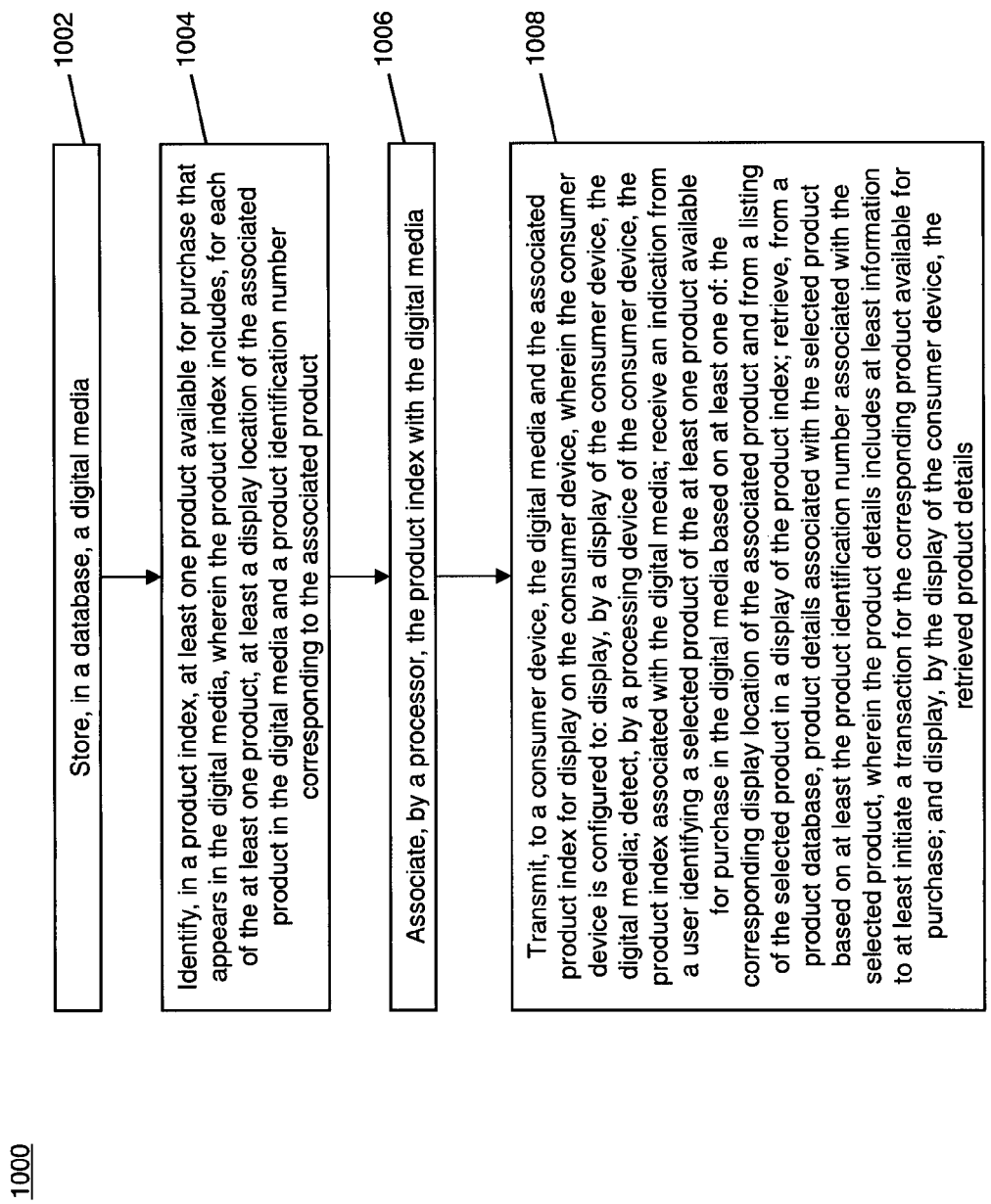
FIG. 10 is a flow chart illustrating an exemplary method for distributing digital media to a consumer device in accordance with exemplary embodiments.

FIG. 10 illustrates a method 1000 for distributing digital media (e.g., the digital media 108) to a consumer device (e.g., the consumer device 102). In step 1002, the digital media 108 may be stored in a database (e.g., a database of the content provider 106). In one embodiment, the digital media may be at least one of: still images or advertisements, moving picture images, animated images, video games, and audio.

In step 1004, a product index (e.g., the product index 109) including at least one product available for purchase that appears in the digital media 108 may be identified, wherein the product index 109 may include, for each of the at least one product, at least a display location (e.g., the display location 508) of the associated product in the digital media 108 and a product identification number (e.g., the product identification number 504) corresponding to the associated product. In step 1006, the product index 109 may be associated with the digital media 108 by a processor (e.g., of the content provider 106).

In step 1008, the digital media 108 and associated product index 109 may be transmitted to the consumer device 102 for the display of the digital media 108 on the consumer device 102. The consumer device 102 may be configured to: display, by a display (e.g., the display 104) of the consumer device 102, the digital media 108; detect, by a processing device (e.g., the processing device 202) of the consumer device 102, the product index 109 associated with the digital media 108; receive an indication from a user identifying a selected product of the at least one product available for purchase in the digital media 108 based on at least one of: the corresponding display location 508 of the associated product and from a listing of the selected product in a display of the product index 109; retrieve, from a product database (e.g., the product database 112), product details (e.g., the product details 304) associated with the selected product based on at least the product identification number 504 associated with the selected product, wherein the product details 304 includes at least information to at least initiate a transaction for the corresponding product available for purchase; and display, by the display 104 of the consumer device 102, the retrieved product details 304.

The products may be placed in a virtual shopping cart as shown in FIGS. 7A and 7B, added to a wish list or identified for displaying a selection of like products. The product selection having been facilitated by the present disclosure can seamlessly initiate a purchase process, including using input or pre-stored consumer information, such as preferred payment method(s), shipping address(es), shipping preferences, with interactive or preselections as is conventional, perhaps using the acquirer 118 and issuer 120 as shown in FIG. 1. Likewise, order fulfillment would be carried out by the merchant or product provider 114, as is conventional. The server 110, can be associated with a payment processor such as MasterCard, or by the product provider 114 or proxies of either or both.

Techniques consistent with the present disclosure provide, among other features, systems and methods for distributing digital media to a consumer device and displaying product details on a consumer device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:
1. A method for displaying product information on a consumer device, comprising:
preparing for display, by a display of the consumer device, digital media that illustrates at least one product available for purchase;

receiving, by a receiving device, an index of the at least one product available for purchase, wherein the index includes, for each of the at least one product available for purchase,
- at least a display location of the respective product in the digital media, and
- a product identification number corresponding to the respective product;

detecting, by a processing device, that the digital media includes an indication that the at least one product appearing in the digital media is available for purchase based on the received index;

receiving, from a product database, a plurality of product data sets, wherein each data set in the plurality of product data sets includes:
- at least a product identifier corresponding to one of the at least one product available for purchase, and
- product details that at least include information to initiate a transaction for the corresponding product available for purchase;

receiving an indication from a user identifying a selected product of the at least one product based at least on the display location in the digital media of the selected product;

determining the product identification number associated with the selected product based on the display location of the selected product identified by the indication from the user;

retrieving, from the received product data sets, product details associated with the selected product based on the product identification number associated with the selected product and the product identifier associated with the product details; and displaying, by the display, the retrieved product details.

2. The method of claim 1, further comprising:
transmitting, by a transmitting device, a request for additional product information, wherein the request for additional product information includes at least the product identification number corresponding to the selected product; and
receiving, by a receiving device, additional product information corresponding to the selected product, wherein displaying the retrieved product details further comprises displaying the received additional product information.

3. The method of claim 1, wherein the digital media is at least one of: still images or advertisements, moving picture images, animated images, video games, and audio.

4. The method of claim 1, wherein detecting whether the digital media includes the indication further comprises detecting header information included in the digital media.

5. The method of claim 1, wherein receiving the plurality of product data sets further comprises receiving the plurality of product data sets as a result of the detecting whether the digital media includes the indication.

6. The method of claim 1, wherein each product data set in the plurality of product data set further includes at least one of: product description, purchase information, merchant information, sizing information, and quantity information.

7. The method of claim 1, wherein the display of the consumer device is a capacitive touch display and wherein the indication from the user is a touch-based gesture on the capacitive touch display.

8. The method of claim 7, wherein the touch-based gesture is performed at the display location of the selected product on the capacitive touch display.

9. The method of claim 1, wherein the information to at least initiate the transaction for the corresponding product available for purchase includes information as to where the corresponding product can be purchased at a physical location of a merchant.

10. The method of claim 1, wherein the information to at least initiate the transaction for the corresponding product available for purchase includes information as to where the corresponding product can be purchased online.

11. The method of claim 1, wherein the information to at least initiate the transaction for the corresponding product available for purchase includes at least one of: funding information and shipping information.

12. The method of claim 1, wherein displaying the retrieved product details includes displaying the retrieved product details concurrently with the digital media.

13. The method of claim 1, wherein the product identifier is at least one of: a universal product code (UPC), a manufacturer part number (MPN), a serial number, an international standard book number (ISBN), a European article number (EAN), and a product identifier unique to the corresponding product.

14. The method of claim 1, further comprising:
adding at least the product identifier associated with the selected product to a list of desired products for a later purchase of the selected product.

15. The method of claim 1, further comprising:
reporting at least the product identifier associated with the selected product and the digital media.

16. The method of claim 1, further comprising:
displaying, by the display of the consumer device, an indication of the availability of the at least one product available for purchase in the digital media.

17. The method of claim 16, wherein the indication is a glow surrounding the at least one product available for purchase.

18. The method of claim 16, wherein displaying the indication of the availability of the at least one product is performed in response to a user command.

19. The method of claim 18, wherein the user command is a user interaction with an image displayed on the display of the consumer device.

20. The method of claim 18, wherein the user command is a user interaction with the consumer device.

21. The method of claim 18, wherein the user command is a voice command.

22. The method of claim 1 further comprising displaying the at least one product available for purchase with visual indications.

23. A method for distributing digital media to a consumer device, comprising:
storing, in a database, a digital media;
identifying, in a product index, at least one product available for purchase that appears in the digital media, wherein the product index includes, for each of the at least one product,
- at least a display location of the respective product in the digital media, and
- a product identification number corresponding to the respective product;

associating, by a processor, the product index with the digital media; and transmitting, to the consumer device, the digital media and the associated product index for display on the consumer device, wherein the consumer device is configured to
display, by a display of the consumer device the digital media, detect, by a processing device of the consumer device, the product index associated with the digital media, receive an indication from a user identifying a selected product of the at least one product available for purchase in the digital media based on the corresponding display location of the associated product, determine the product identification number associated with the selected product based on the display location of the selected product identified by the indication from the user, retrieve product details associated with the selected product from a plurality of previously received product data sets based on at least the product identification number associated with the selected product, wherein the product details includes at least information to at least initiate a transaction for the corresponding product available for purchase, and display, by the display of the consumer device, the retrieved product details.

24. The method of claim 23, wherein the digital media is at least one of: still images or advertisements, moving picture images, animated images, video games, and audio.

25. A consumer device, comprising:
a display configured to display digital media;
a receiver configured to receive, from a product database, at least one product data set, wherein each product data set of the at least one product data set includes:
at least a product identifier corresponding to a product available for purchase, and
product details that include at least information to initiate a transaction for the corresponding product available for purchase; and
a processor configured to
detect whether the digital media includes an indication that at least one product appearing in the digital media may be available for purchase,
identify an index of the at least one product available for purchase that appears in the digital media, wherein the index includes, for each of the at least one product,
at least a display location of the respective product in the digital media, and
a product identification number corresponding to the respective product,
receive an indication from a user identifying a selected product of the at least one product available for purchase based on the associated display location of the selected product,
determine the product identification number associated with the selected product based on the display location of the selected product identified by the indication from the user,
identify, in the received at least one product data set, product details associated with the selected product based on at least the product identification number associated with the selected product and the product identifier associated with the product details, and
cause the display to display the identified product details.

26. The consumer device of claim 25, further comprising:
a transmitter configured to transmit a request for additional product information, wherein the request for additional product information includes at least the product identification number corresponding to the selected product, wherein the receiver is further configured to receive additional product information corresponding to the selected product, and the display is further configured to display the received additional product information.

27. The consumer device of claim 25, wherein the digital media is at least one of: still images or advertisements, moving picture images, animated images, video games, and audio.

28. The consumer device of claim 25, wherein detecting whether the digital media includes the indication further comprises detecting header information included in the digital media.

29. The consumer device of claim 25, wherein receiving the at least one product data set further comprises receiving the at least one product data set as a result of the processor detecting whether the digital media includes the indication.

30. The consumer device of claim 25, wherein each product data set in the at least one product data set further includes at least one of: product description, purchase information, merchant information, sizing information, and quantity information.

31. The consumer device of claim 25, wherein the display is a capacitive touch display and wherein the indication from the user is a touch-based gesture on the capacitive touch display.

32. The consumer device of claim 31, wherein the touch-based gesture is performed on at the display location of the selected product on the capacitive touch display.

33. The consumer device of claim 25, wherein the information to at least initiate the transaction for the corresponding product available for purchase includes information as to where the corresponding product can be purchased at a physical location of a merchant.

34. The consumer device of claim 25, wherein the information to at least initiate the transaction for the corresponding product available for purchase includes information as to where the corresponding product can be purchased online.

35. The consumer device of claim 25, wherein the information to at least initiate the transaction for the corresponding product available for purchase includes at least one of: funding information and shipping information.

36. The consumer device of claim 25, wherein displaying the identified product details includes displaying the identified product details concurrently with the digital media.

37. The consumer device of claim 25, wherein the product identifier is at least one of: a universal product code (UPC), a manufacturer part number (MPN), a serial number, an international standard book number (ISBN), a European article number (EAN), and a product identifier unique to the corresponding product.

38. The consumer device of claim 25, wherein the processor is further configured to:
add at least the product identifier associated with the selected product to a list of desired products for a later purchase of the selected product.

39. The consumer device of claim 25, further comprising:
a reporter configured to report at least the product identifier associated with the selected product and the digital media.

40. The consumer device of claim 25, wherein the processor is further configured to cause the display to display an indication of the availability of the at least one product available for purchase in the digital media.

41. The consumer device of claim 40, wherein the indication is a glow surrounding the at least one product available for purchase.

42. The consumer device of claim 40, wherein displaying the processor is further configured to display the indication of the availability of the at least one product in response to a user command.

43. The consumer device of claim 42, wherein the user command is a user interaction with an image displayed on the display.

44. The consumer device of claim 42, further comprising a button, wherein the user command is a user interaction with the image.

45. The consumer device of claim 42, wherein the user command is a voice command.

46. A system for distributing digital media to a consumer device, comprising:
a database configured to store a digital media;
a processor configured to
identify, in a product index, at least one product available for purchase that appears in the digital media, wherein the product index includes, for each of the at least one product,
at least a display location of the respective product in the digital media, and
a product identification number corresponding to the respective product, and
associate, the product index with the digital media; and
a transmitter configured to transmit, to the consumer device, the digital media and the associated product index for display on the consumer device, wherein the consumer device is configured to
display, by a display of the consumer device the digital media,
detect, by a processing device of the consumer device, the product index associated with the digital media,
receive an indication from a user identifying a selected product of the at least one product available for purchase in the digital media based on the corresponding display location of the associated product,
determine the product identification number associated with the selected product based on the display location of the selected product identified by the indication from the user,
retrieve product details associated with the selected product from a plurality of previously received product data sets based on at least the product identification number associated with the selected product, wherein the product details includes at least information to at least initiate a transaction for the corresponding product available for purchase, and
display, by the display of the consumer device, the retrieved product details.

47. The system of claim 46, wherein the digital media is at least one of: still images or advertisements, moving picture images, animated images, video games, and audio.

* * * * *